United States Patent Office 2,800,391
Patented July 23, 1957

2,800,391

OXIDATION DEPRESSANTS FOR TITANOUS SULFATE SOLUTIONS

Myron L. Myers and Guy C. Marcot, Lynchburg, Va., assignors to American Cyanamid Company, New York, N. Y., a corporation of Maine No Drawing. Application December 18, 1953, Serial No. 399,172

7 Claims. (Cl. 23—117)

The present invention relates to a method for inhibiting oxidation of titanous sulfate in aqueous solution by air. The present invention particularly relates to a method for inhibiting oxidation of titanous sulfate when a titanium sulfate digestion cake having a content of titanous sulfate is dissolved in aqueous medium and air is blown through the solution to supply agitation while the cake is dissolving.

Titanium sulfate digestion cakes containing titanous sulfate are currently manufactured on a large scale by reacting a titaniferous slag with substantially the minimum amount of strong sulfuric acid necessary to form a cake which will dissolve in water readily. The slags referred to contain, typically, 1%–10% of iron calculated as FeO, 65%–85% or more of titanium calculated as $TiO_2$, but of this titanium a substantial amount, typically 5% to 20%, is present in reduced form; that is, in a form having a valence less than 4. Recent developments have provided methods for oxidizing nearly all of this trivalent titanium to titanic titanium prior to the step of dissolving the cake in water, dilute sulfuric acid, or other aqueous medium and, therefore, the cakes generally contain a major proportion of titanic sulfate and a minor proportion of titanous sulfate.

Normally, the digestion cake is dissolved in water and air is blown through the water to accelerate the dissolving process. Recovery of the titania values from the resulting liquor, however, requires that the liquor contain a sufficient amount, for example, 1 to 4 grams per liter of titanous sulfate (calculated as $TiO_2$) to prevent oxidation of the ferrous sulfate to ferric form. Blowing the liquor with air, however, causes extensive oxidation of titanous sulfate and this in turn sets a practical limit upon the amount of agitation which can be provided when it is desired that the resulting liquor contain the specified amount of titanous sulfate. Thereby a limit is set upon the speed with which the cake can be dissolved.

The discovery has now been made that polysiloxanes in finely-divided form are effective inhibitors for the air oxidation of titanous sulfate in aqueous solution. By "air oxidation" is meant the oxidation resulting from access of air thereto.

According to the invention air oxidation of titanous sulfate in aqueous solution is inhibited by incorporating in the solution a small but effective amount of a polysiloxane in finely-divided form.

The invention is usefully employed in improving the stability of aqueous titanous sulfate solutions stored with access of air. Incorporation of a small amount of finely-divided polysiloxane in the solution substantially diminishes the amount of oxidation the titanous sulfate would otherwise undergo.

Industrially, in the manufacture of titanium sulfate solutions for conversion into titanium dioxide of pigmentary quality, the invention is most conveniently employed by separately forming an aqueous polysiloxane dispersion and metering the dispersion into the water or aqueous liquid employed for dissolving the titanium sulfate digestion cake. Substantially more vigorous aeration can then be employed without decreasing the amount of titanous sulfate in the liquor obtained upon dissolution of the entire cake. In other instances, particularly when the cake contains a large amount of titanous sulfate, it is desirable to defer addition of the polysiloxane until part or nearly all of the cake has dissolved, and this is included within the present invention.

Only a very small amount of polysiloxane need be added, generally 1 to 50 parts per million based on the total weight of the solution and often less than 1 part per million is advantageously employed.

The polysiloxanes referred to are organosilicon polymers formed by hydrolysis of monomeric silanes carrying two or three hydrolyzable groups as may be preferred. The polysiloxanes are known as a class, and are conveniently prepared for use by forming a solution thereof in benzene, toluene, xylene, or other hydrocarbon solvent. Hydrolysis of the monomer or mixture of monomers takes place upon admixture of the monomer with water, a substantially self-sustaining dispersion rapidly forming.

The hydrocarbon solvent in large part floats to the surface of the water, and if desired may be removed in large part by decantation. In certain instances, particularly when higher boiling hydrocarbons are employed as the solvent, droplets of the hydrocarbon may attach themselves to the polysiloxane particles. This tends to increase the stability of the dispersion and causes no undue harm.

The linear polysiloxanes formed by hydrolysis of the readily obtainable short-chain (i. e., $C_1$–$C_8$) dialkylsilanes such as dimethyl dichlorosilane have given very satisfactory results and are therefore preferred.

The invention will be further described with reference to the examples which follow. The examples set forth specific embodiments of the invention and are not to be construed as limitations thereon. Parts are by weight unless otherwise stated.

*Example 1*

A laboratory digestion cake formed by reacting sulfuric acid of 88% strength with a ferro-titaniferous slag containing 7.5% of iron calculated as FeO, 72% of total titanium calculated as $TiO_2$, 15% of reduced titanium as $TiO_2$, and minor amounts of aluminum, calcium, magnesium, vanadium and columbium oxides together with silica was dissolved in water.

A sample of the liquor was withdrawn and adjusted to a specific gravity of 1.500 by addition of water. The liquor contained about 2% by weight of the insoluble or unreacted constituents of the cake and on analysis was found to contain 6.0 grams per liter of dissolved titanous sulfate calculated as $TiO_2$.

The liquor was stirred to distribute the insoluble matter and two one-liter portions were withdrawn. One portion was retained as control. To the other was added 20 parts per million (solids basis) of a hydrocarbon oil containing suspension containing a minor amount of the polysiloxane formed by adding a solution of dimethyldichlorosilane in a lower hydrocarbon solvent to a volume of water.

The two portions were heated to 50–55° C. in open beakers for five hours and agitated by air injector agitators, water being added occasionally to maintain the volume. The samples were then cooled and analyzed. The control sample contained 3.6 grams per liter of titanous sulfate, whereas the solution containing the polysiloxane contained 4.6 grams per liter of titanous sulfate.

Calculations showed that of the titanous sulfate in the original solution 40% was oxidized in the control sample, whereas only 23% was oxidized in the sample containing the polysiloxane.

The two solutions were reheated, this time to 80–85° C.

and aerated as before for an additional 5 hours. At the end of this time the control sample was found on analysis to contain no titanous sulfate. The sample containing the polysiloxane, however, contained 1.2 grams per liter of titanous sulfate.

Example 2

The procedure for the preparation of the test portions of Example 1 was repeated except that a different sample of digestion cake liquor was used which contained 8.15 grams per liter of titanous sulfate calcuated as $TiO_2$, the polysiloxane dispersion was free from hydrocarbon oil, the amount of polysiloxane added was 1 part per million based on the total weight of the liquor, the tests were run at 80° C., and the air was passed through at the rate of 600 ml./min. through porous Alundum diffusers located at the bottom of the graduates. The polysiloxane was prepared by adding 32 grams of a 50% solution of dimethyldichlorosilane in benzene to 400 cc. of water. An aqueous dispersion of the polysiloxane formed at once which was allowed to stand and the dispersion drawn off from the benzene layer.

Samples were withdrawn at the end of every hour and analyzed for reduced titania. Results are as follows:

| Hours of Aeration | Reduced Titania— Gram per liter | |
|---|---|---|
| | Control Solution | Polysiloxane Containing Solution |
| 0 | 8.15 | 8.15 |
| 1 | 6.2 | 7.2 |
| 2 | 4.4 | 6.6 |
| 3 | 1.9 | 5.7 |
| 4 | 0.9 | 5.4 |
| 5 | Nil | 4.2 |

Inspection of the table shows that after five hours of aeration the polysiloxane-containing solution contained about as much titanous sulfate as the control solution contained at the end of two hours of aeration.

Example 3

The procedure of Example 2 was repeated except a digestion cake liquor containing 8.8 grams per liter of titanous sulfate, calculated as $TiO_2$, was used which had been filtered to remove undissolved digestion cake and other undissolved materials therefrom, and the test was run at a temperature of 80° C.

At the end of 3.75 hours the control liquor contained no titanous sulfate, whereas the liquor to which the polysiloxane had been added contained 4.4 grams per liter of titanous sulfate, calculated as $TiO_2$.

Example 4

The effectiveness of polysiloxanes in stabilizing laborator titanous sulfate solutions is shown by the following:

A laboratory purple-violet solution consisting of 1.0% of titanous sulfate and 0.1% of titanic sulfate in sulfuric acid of 30% strength, formed by electrolytic reduction of a titanic sulfate solution, was divided into two portions. One portion was retained as control. To the other was added the polysiloxane of Example 1 in amount of 1 part per million based on the weight of the solution.

Both solutions were stored in half-filled stoppered bottles at room temperature for ten weeks, the bottles being opened occasionally during the interval.

At the end of ten weeks the solution to which the polysiloxane had been added was dark violet in color, showing a substantial content of titanous sulfate. The control solution, however, was completely clear and colorless and was as transparent as water, showing that all the titanous sulfate therein had oxidized.

We claim:

1. The method of inhibiting air oxidation of titanous sulfate in aqueous solution which consists in incorporating therein a small amount of an organic polysiloxane in dispersed form, said polysiloxane comprising a polymer of an alkylsilane the alkyl groups of which contain not in excess of 8 carbon atoms.

2. The method of inhibiting air oxidation of a minor amount of titanous sulfate in an aqueous solution comprising a major amount of titanic sulfate which consists in incorporating therein a small amount of an organic polysiloxane in dispersed form, said polysiloxane comprising a polymer of an alkylsilane the alkyl groups of which contain not in excess of 8 carbon atoms.

3. A method of inhibiting air oxidation of titanous sulfate in an aqueous solution formed by dissolving a titanium sulfate digestion cake in aqueous medium, said cake containing titanous sulfate, which consists in incorporating therein a small amount of an organic polysiloxane in dispersed form, said polysiloxane comprising a polymer of an alkylsilane the alkyl groups of which contain not in excess of 8 carbon atoms.

4. A method of inhibiting air oxidation of titanous sulfate in a solution formed by dissolving a titanium sulfate digestion cake in aqueous medium, said cake containing a major amount of a titanic sulfate and a minor amount of a titanous sulfate, which consists in incorporating therein a small amount of an organic polysiloxane in dispersed form, said polysiloxane comprising a polymer of an alkylsilane the alkyl groups of which contain not in excess of 8 carbon atoms.

5. A method of inhibiting air oxidation of titanous sulfate while a titanous sulfate containing titanium sulfate digestion cake is dissolved in aqueous medium and while air is blown through said water to agitate said water as said cake dissolves, which consists in incorporating a small amount of an organic polysiloxane in dispersed form in said water, said polysiloxane comprising a polymer of an alkylsilane the alkyl groups of which contain not in excess of 8 carbon atoms.

6. An aqueous solution comprising titanous sulfate and an effective amount of an organic polysiloxane in dispersed form as agent inhibiting the oxidation of said titanous sulfate by air, said polysiloxane comprising a polymer of an alkylsilane the alkyl groups of which contain not in excess of 8 carbon atoms.

7. An aqueous solution comprising a minor amount of titanous sulfate, a major amount of titanic sulfate and an effective amount of an organic polysiloxane in dispersed form as agent inhibiting the oxidation of said titanous sulfate by air, said polysiloxane comprising a polymer of an alkylsilane the alkyl groups of which contain not in excess of 8 carbon atoms.

References Cited in the file of this patent

UNITED STATES PATENTS

| 2,589,909 | Weikel | Mar. 18, 1952 |
| 2,643,240 | Walton | June 23, 1953 |

OTHER REFERENCES

MacGregor: "Silicones and Their Uses," McGraw-Hill Book Co., New York, 1954.